(12) United States Patent
Okubo et al.

(10) Patent No.: US 7,876,013 B2
(45) Date of Patent: Jan. 25, 2011

(54) BRUSHLESS MOTOR

(75) Inventors: Masayuki Okubo, Kiryu (JP); Satoru Negishi, Kiryu (JP); Koji Nara, Kiryu (JP); Takeshi Yamazaki, Kiryu (JP)

(73) Assignee: Mitsuba Corporation, Gunma (JP)

( * ) Notice: Subject to any disclaimer, the term of this patent is extended or adjusted under 35 U.S.C. 154(b) by 106 days.

(21) Appl. No.: 12/379,668

(22) Filed: Feb. 26, 2009

(65) Prior Publication Data

US 2009/0224620 A1 Sep. 10, 2009

(30) Foreign Application Priority Data

Mar. 5, 2008 (JP) ............................. 2008-054773

(51) Int. Cl.
*H02K 1/28* (2006.01)
(52) U.S. Cl. ...................... 310/156.47; 310/156.22; 310/114
(58) Field of Classification Search ............ 310/156.21, 310/156.25, 156.26, 156.36, 156.37, 156.47, 310/216.035, 216.044, 216.048, 216.051, 310/114
See application file for complete search history.

(56) References Cited

U.S. PATENT DOCUMENTS 4,642,502 A * 2/1987 Carpenter et al. ...... 310/156.12
5,397,951 A * 3/1995 Uchida et al. .......... 310/156.21
7,518,277 B2 * 4/2009 Nemoto et al. ......... 310/156.47
2002/0163270 A1* 11/2002 Almada ................. 310/156.47

FOREIGN PATENT DOCUMENTS

| JP | 2001-218403 | 8/2001 |
|---|---|---|
| JP | 2001-346346 | 12/2001 |
| JP | 2003-284276 | 10/2003 |
| JP | 2003-339129 | 11/2003 |
| JP | 2004-159492 | 6/2004 |
| JP | 2004-180491 | 6/2004 |
| JP | 2004-208341 | 7/2004 |
| WO | 2006/008964 | 1/2006 |

* cited by examiner

*Primary Examiner*—Quyen Leung
*Assistant Examiner*—Naishadh N Desai
(74) *Attorney, Agent, or Firm*—Wenderoth, Lind & Ponack, L.L.P.

(57) ABSTRACT

A brushless motor has rotor cores dividedly formed as plural sections in an axial direction, segment magnets secured to outer circumferential surfaces of the rotor cores, and magnet holders secured to the rotor cores, respectively, for holding the segment magnet. Each of the rotor cores has holder-positioning grooves to which holder arms are fitted, and bridge parts formed corresponding to the holder positioning grooves. Each of the magnet holders has joint grooves fitted in the bridge parts and displaced from the holder arms by a step angle, the bridge parts being fitted in the joint grooves, thereby assembling a rotor.

4 Claims, 6 Drawing Sheets

BRUSHLESS MOTOR

BACKGROUND OF THE INVENTION

1. Field of the Invention

The present invention relates to a brushless motor that has a skew structure. More particularly, the invention relates to a brushless motor having a step-skew structure by means of segment magnets.

2. Related Art Statement

Hitherto known, as means for reducing cogging torque and torque ripple, is the skew structure in which the rotor poles or the like are inclined to the axis direction. In most brushless motors of skew structure, ring magnets are used as pole magnets. In any motor using ring magnets, the magnets are skew-magnetized in order to reduce cogging torque and torque ripple.

In brushless motors designed for use in electric power steering apparatuses, the segment magnets that can be magnetized at high flux density are increasingly used as rotor magnets, thereby to meet the demand that the motors should be smaller and should yet achieve a large output. However, the segment magnets (right-angled magnetic field type magnets) cannot be skew-magnetized due to the restriction imposed on its manufacture. In any motor that has segment magnets, the segment magnets are therefore stacked one on another, thus achieving a so-called step skew in order to perform skew structure.

In the motor of step-skew structure, pluralities of segment magnets are arranged in the axial direction. In each stage, each segment magnet is displaced by a prescribed angle in the circumferential direction. The magnetic poles are thereby displaced stepwise in the axial direction, forming a step-skew structure. Each magnet is secured to the outer circumferential surface of the rotor core, by using an adhesive. The adhesive of thermosetting type is used in most cases. Each magnet to which the adhesive is applied is adhered on the rotor core. On the rotor core, the magnets are positioned by using a dedicated jig and they are heated, whereby the magnets are fixed on the rotor core.

In the motor of such a step-skew structure, the more the magnets are stacked, the lower the steps will be, thus the cogging torque and torque ripple can be reduced. However, as the number of magnets stacked increases, the sum of the positioning errors of magnets will increase and the variation from the design specification in terms of skew angle will increase. Consequently, the motor of the step-skew structure fails to obtain performance as designed. Particularly, if secured to the rotor core with the adhesive, the magnets are easily displaced during the manufacture of the motor. Inevitably, the magnets are likely to have positional errors. Further, because adhesive is applied to secure the magnets to the rotor core, the excessive adhesive may stick to the jig, which lowers the working efficiency of the motor.

SUMMARY OF THE INVENTION

An object of the present invention is to provide a brushless motor in which the skew angle at which the segment magnets are stacked can be easily set and the variation of skew angle can be reduced.

A brushless motor according to this invention has a step-skew structure. The motor includes: rotor cores dividedly formed as plural sections in an axial direction; a plurality of segment magnets secured to circumferential surfaces of the rotor cores, respectively; magnet holders secured to the rotor cores and each having holder arms holding the segment magnet on an outer circumferential surface of the rotor core; and each of the rotor cores is displaced from one another by a step angle in a circumferential direction. Each of the rotor cores has holder-positioning parts and core side joint parts. The holder-positioning parts are made in the outer circumferential surface of the rotor core and are configured to hold the holder arms. The core side joint parts have a prescribed positional relation with the holder-positioning parts. Each of the magnet holders has holder side joint parts fitted in the core side joint parts and arranged in a prescribed positional relation with the holder arms.

In the brushless motor with the step-skew structure, according to this invention, each rotor core has core side joint parts, and each magnet holder has holder side joint parts, too. The core side joint parts are fitted in the holder side joint parts, whereby the rotor is assembled. At this point, the core side joint parts are connected to, with a specific positional relation, the holder arm of the magnet holder. Also, the holder side joint parts are arranged in a specific positional relation with the holder arm. Therefore, the rotor core and the magnet holder are assembled with the specific positional relation when the core side joint parts and the holder side joint parts are joined to each other. It is possible to mechanically set and assemble the step angle of the step-skew structure. Accordingly, unevenness of the skew angles can be reduced as compared to the motor which fixes the magnets with an adhesive.

In the brushless motor described above, each of the rotor cores may have a plurality of lightening holes equidistantly formed in the circumferential direction, and the core side joint parts may be bridge parts, each provided between two adjacent lightening holes. Moreover, each magnet holder may have joint projections provided so that lightening holes may be faced, and can be inserted in the lightening hole, and the holder side joint parts may be joint grooves, each formed between the projections. Further, the joint grooves may be displaced from the holder arms, by the step angle in the circumferential direction.

DETAILED DESCRIPTION OF THE PREFERRED EMBODIMENTS

Figure 1:
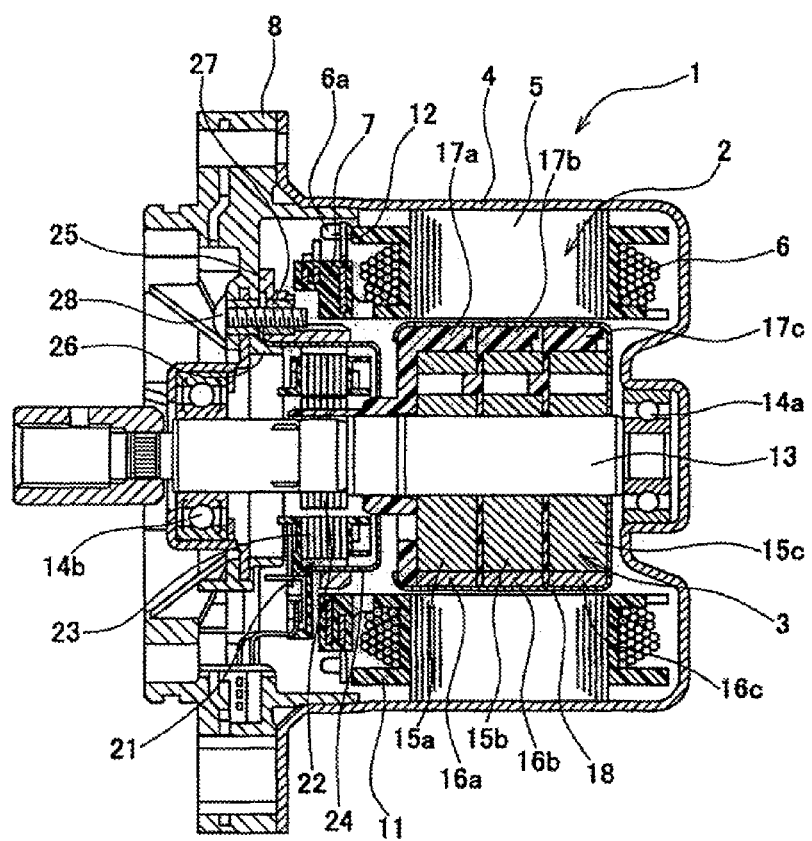
FIG. 1 is a sectional view of a brushless motor according to an embodiment of the present invention.

An embodiment of the present invention will be described in detail, with reference to the accompanying drawings. FIG. 1 is a sectional view of a brushless motor according to an embodiment of the present invention. As shown in FIG. 1, the brushless motor 1 (hereinafter referred to as "motor 1") is an inner-rotor type that has a stator 2 and a rotor 3 arranged in the stator 2. For example, the motor 1 may be used as the power source of an electric power-steering (EPS) apparatus of column-assist type. The motor 1 can apply an auxiliary drive force to the steering shaft. The motor 1 is secured to a speed-reducing mechanism, which is in turn coupled to the steering shaft. The speed-reducing mechanism reduces the rotational speed of the motor 1 and transmits the rotation to the steering shaft.

The stator 2 includes a case 4, a stator core 5, stator coils 6, and a bus-bar unit (terminal unit) 7. The stator coils 6 (hereinafter called "coils 6") are wound around the stator core 5. The bus-bar unit 7 is attached to the stator core 5. The case 4 is a bottomed hollow cylinder made of iron or the like. The case 4 has openings. In the openings, brackets 8 made of die-cast aluminum are fitted. The brackets 8 are secured to the case 4 with fastening screws (not shown).

Figure 2:
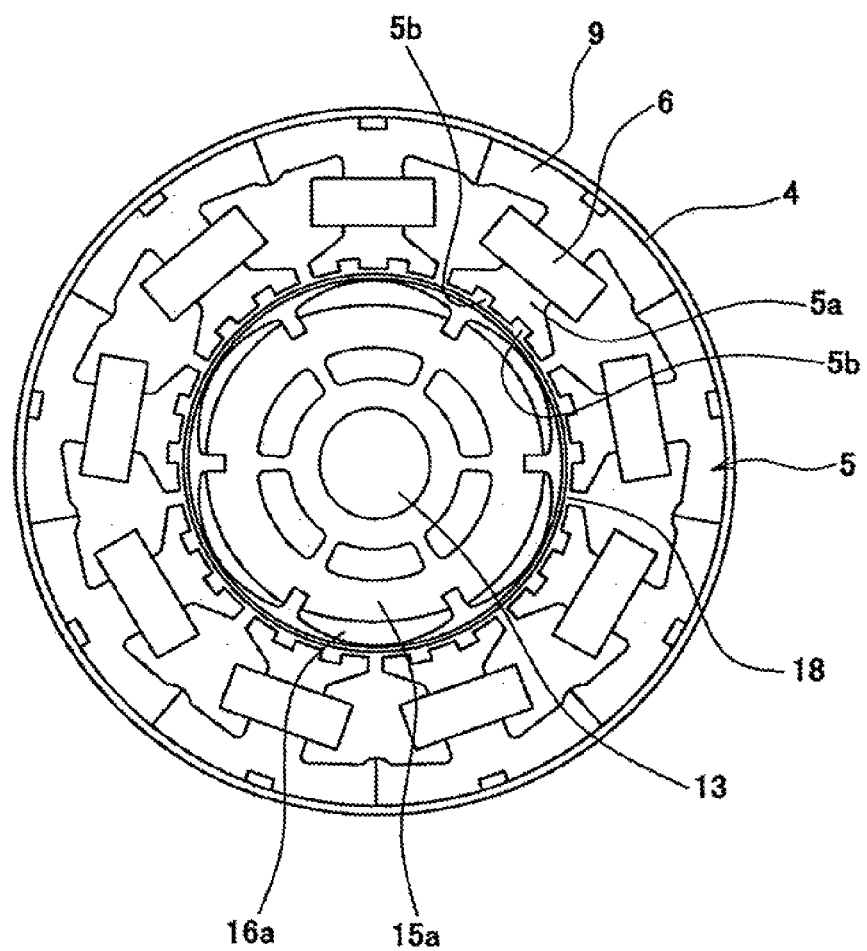
FIG. 2 is a diagram explaining the configuration of the stator of the motor of FIG. 1.

As shown in FIG. 2, the stator core 5 is composed of core segments 9 (nine segments, in this embodiment) that are arranged in the circumferential direction. The stator core 5 has nine teeth 5a that project inside in the radial direction. The distal end of the stator core 5 has 2n grooves 5b (two grooves, in this embodiment). The grooves 5b are designed to reduce cogging torque resulting from pseudo slot effect. Each core segment 9 has been produced by stacking core pieces (i.e., electromagnetic steel plates). An insulator 11 made of synthetic resin surrounds the core segments 9.

The coils 6 are wound around the insulator 11. One end part 6a of each coil 6 is lead at the one end of the stator core 5. The bus-bar unit 7 is secured to the one end of the stator core 5. Bus bars made of copper are inserted in the casing of the bus-bar unit 7 that is made of synthetic resin. From the circumferential surface of the bus-bar unit 7, a plurality of power supply terminals 12 protrude in the radial direction. The end part 6a of each coil 6 has been welded to the power supply terminals 12 at the time of fastening the bus-bar unit 7. The bus-bar unit 7 has as many bus bars as the number of phases of the motor 1 (in this embodiment, three bus bars are provided for U, V and W phases, respectively). Each coil 6 is electrically connected to the power supply terminal 12 for the associated phase. The stator core 5 has been press-fitted and fixed in the case 4 after the bus-bar unit 7 had been fastened.

Figure 3:
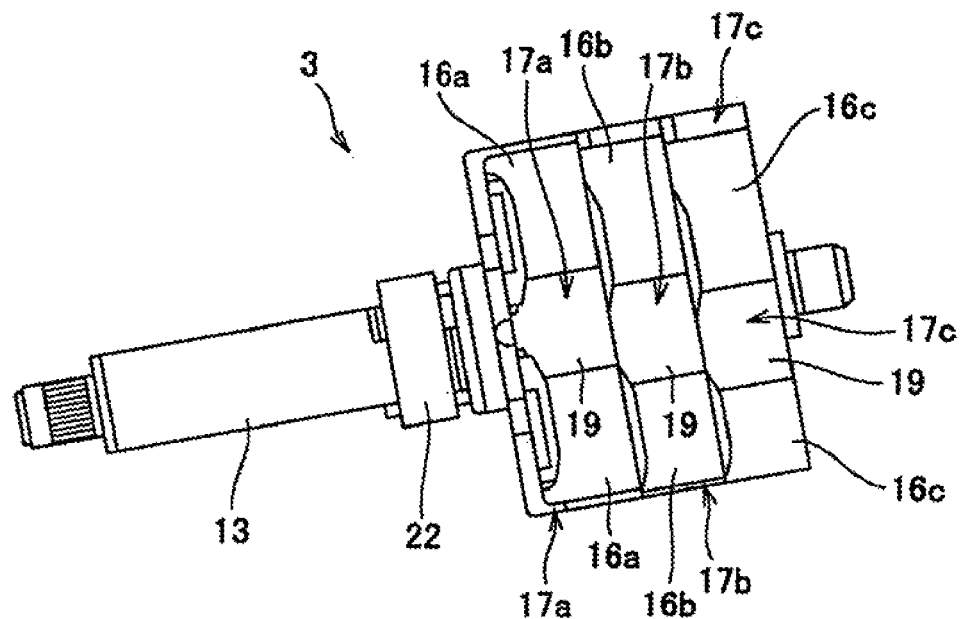
FIG. 3 is a diagram explaining the configuration of the rotor.
Figure 4:
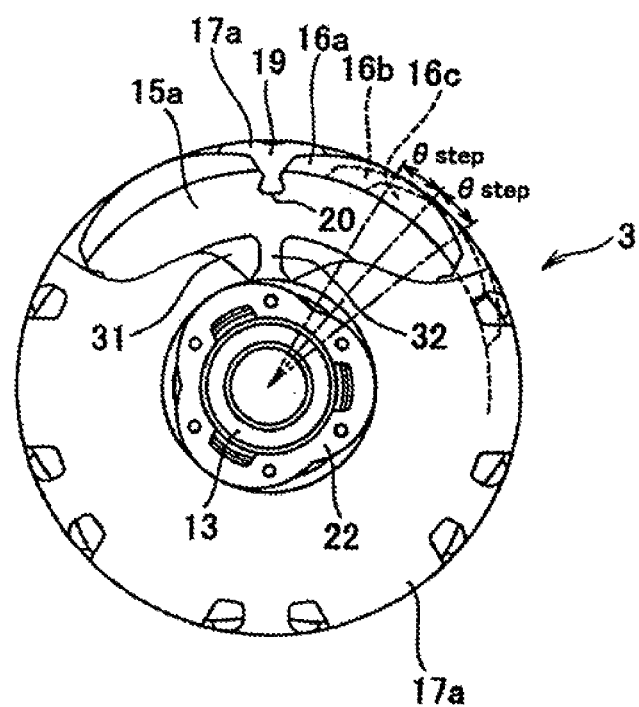
FIG. 4 is a side view (partly sectional) of the rotor, as viewed in the direction of arrow X in FIG. 3.

The rotor 3 is inserted in the stator 2. FIG. 3 is a diagram explaining the configuration of the rotor 3. FIG. 4 is a side view (partly sectional) of the rotor, as viewed in the direction of arrow X in FIG. 3. The rotor 3 has a rotor shaft 13. The rotor shaft 13 can freely rotate, supported by bearings 14a and 14b. The bearings 14a and 14b are fastened to the center part of the bottom of the case 4 and the center part of the bracket 8, respectively. On the rotor shaft 13, a hollow cylindrical rotor core 15a to 15c is secured. To the outer circumferential surfaces of the rotor cores 15a to 15c, a segment-type magnet (permanent magnet) 16a to 16c is fastened. In the motor 1, magnets 16a to 16c are arranged in six rows and three columns along the circumferential direction. That is, the motor 1 has a six-pole, nine-slot structure (hereinafter referred to as "6P9S"). A magnet cover 18, which is a bottomed hollow cylinder, is provided, surrounding the magnets 16a to 16c. Note that, FIG. 3 shows the rotor 3 from which the magnet cover 18 has been removed.

Magnet holders 17a to 17c made of synthetic resin are secured to the outer sides of the magnets 16a to 16c. As shown in FIG. 4, the magnets 16a to 16c are held by the magnet holders 17a to 17c. The magnet holders 17a to 17c are attached to the outer circumferences of the rotor cores 15a to 15c. Holder arms 19 protrude from each of the magnet holders 17a to 17c, in the axial direction. The magnets 16a to 16c are clamped, each between two holder arms 19. Thus, the magnets 16a to 16c are supported on the outer circumferential surfaces of the respective rotor cores 15a to 15c. The holder arms 19 are fitted in positioning grooves 20 (i.e., holder positioning parts) that are made in the outer circumferential surface of the rotor cores 15a to 15c. Therefore, the positional relation between the rotor cores 15a to 15c and the magnets 16a to 16c are determined.

In the motor 1, the magnets 16a to 16c, i.e., three columns (sections) of magnets, are arranged in the axial direction, while held by the magnet holders 17a to 17c. As FIG. 3 shows, the magnets 16a to 16c of each column are displaced from the magnets of any adjacent column having the same polarity in the circumferential direction by a predetermined step angle θstep (the angle between centers of adjacent column magnets). Thus, the rotor 3 of the motor 1 has a step-skew structure, in which the three magnets 16a to 16c of each column are stacked one on another.

Figure 5:
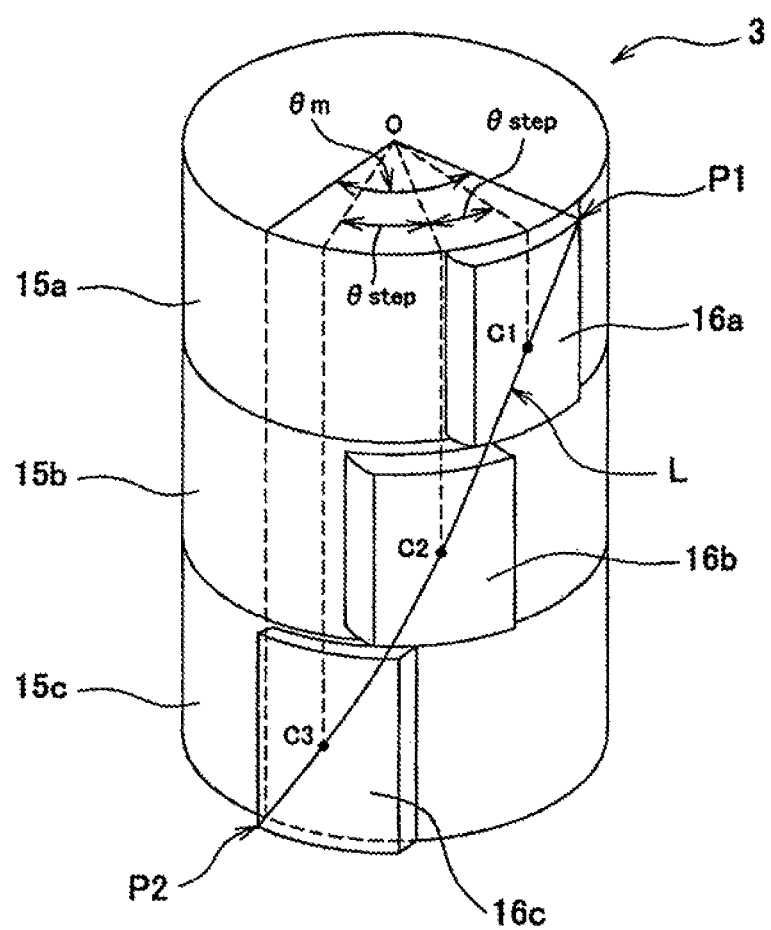
FIG. 5 is a diagram explaining the skew angle the rotor has.

FIG. 5 is a diagram explaining the skew angle of the rotor 3. As shown in FIG. 5, in the step-skew structure, the line L connecting the centers C1 to C3 of the magnets 16a to 16c (in both the circumferential direction and the axial direction) intersects with the outer ends of the magnets 16a and 16c at points P1 and P2, respectively. The center angle to the center O of rotation between the points P1 and P2 is the magnet skew angle θm. Hence, the step angle θstep between the magnets 16a and 16b is a center angle between the points C1 and C2 to the center O of rotation, and the step angle θstep between the magnets 16b and 16c is a center angle between the points C2 and C3 to the center O of rotation. The center angles between the points C1 and P1, C3 and P2 are half the step angle θstep (i.e., θstep/2) respectively. Therefore, the skew angle θm is θstep×(number of magnets stacked−1)+(θstep/2)×2=θstep× number of magnets stacked.

A rotor 22 (resolver rotor) of a resolver 21 used as means for detecting a rotation angle is attached to the end of the magnet holder 17a. By contrast, the stator 23 (resolver stator) of the resolver 21 is pressed into a resolver holder 24 made of metal and held in a resolver bracket 25 made of synthetic resin. The resolver holder 24 is a bottomed hollow cylinder. The resolver holder 24 is press fitted lightly on the outer circumferential surface of a rib 26, which is provided on the center part of the bracket 8. A female screw 27 made of metal is inserted in the resolver bracket 25 and bracket 8. A holding screw 28 is screwed in the female screw 27 from the outside the bracket 8. The resolver 24 is thereby secured in the bracket 8.

Figure 6:
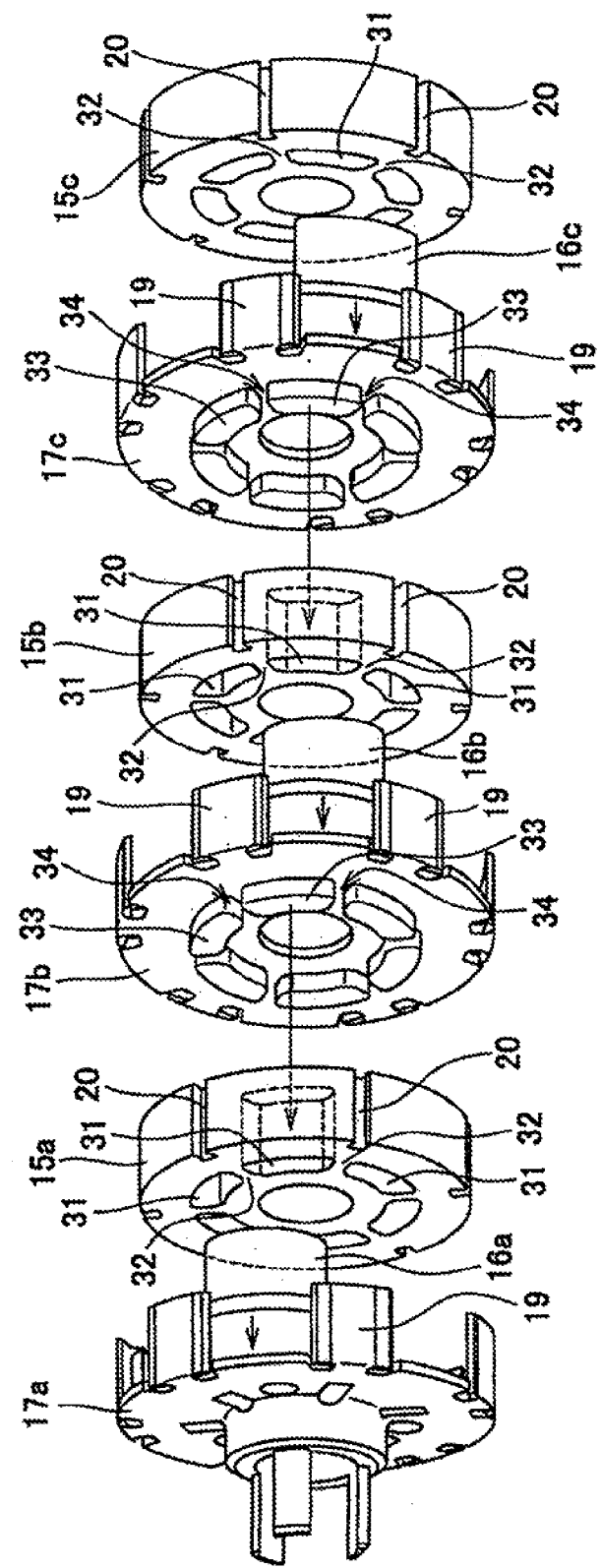
FIG. 6 is a diagram explaining how rotor cores are joined to magnet holders.
Figure 7:
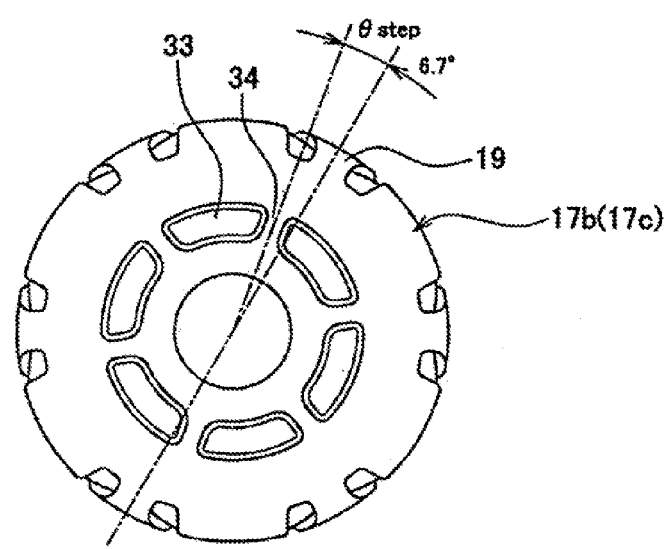
FIG. 7 is diagram explaining the configuration of the magnet holder.

In the assembly process of the motor 1 according to the present invention, a step angle θstep is mechanically set as the rotor cores are joined to the magnet holders. The skew angle θskew=step angle θstep×number of stages (the number of magnets stacked−1) can therefore be set, without unevenness. FIG. 6 is a diagram explaining the state in which rotor cores 15a to 15c are assembled to magnet holders 17a to 17c. FIG. 7 is diagram explaining the structure of the magnet holder 17b (identical in structure to the magnet holder 17c).

As shown in FIG. 6, each of the rotor cores 15a to 15c has lightening holes 31 in order to reduce weight and inertia. The lightening holes 31 extend along the axis of the rotor cores 15a to 15c. A bridge part 32 (i.e., core side joint part) is formed between adjacent two lightening holes 31. On the other hand, each of the magnet holders 17b and 17c has joint projections 33, which protrude along the axis of the magnet holder and which can therefore fit into the lightening holes 31 of an adjacent rotor core. A joint groove 34 (i.e., holder side joint part) are formed between any two adjacent joint projections 33. As shown in FIG. 6, the rotor cores 15a to 15c are joined to the magnet holders 17a to 17c in axial alignment, with the bridge parts 32 fitted in the joint groove 34.

As shown in FIG. 7, in the magnet holders 17b and 17c, the joint grooves 34 are displaced from the holder arms 19, respectively, by angle θstep (for example, 8°) in the circumferential direction. As mentioned above, the magnet holders 17a to 17c determine the positional relation between the rotor cores 15a to 15c and the magnets 16a to 16c. Hence, in any stage having the magnet holders 17b and 17c, the magnets 16b and 16c are displaced from the magnets of the preceding stage (left stage in FIG. 6), by angle θstep in the circumferential direction.

This positional relation will be explained with reference to FIG. 6. First, the magnet 16a is positioned by the magnet holder 17a and the rotor core 15a, as the magnet of a first stage. Next, the bridge parts 32 of the rotor core 15a are fitted into the joint grooves 34 of the magnet holder 17b, forming a second stage. At this point, the magnet 16b fitted in the rotor core 15b is displaced from the magnet 16a at angle θstep, because the joint grooves 34 are displaced by angle θstep from the holder arms 19 at the magnet holder 17b.

Similarly, the bridge parts 32 of the rotor core 15b are fitted into the joint grooves 34 of the magnet holder 17c, thus forming a third stage. At this point, the magnet 16c fitted in the rotor core 15c is displaced from the magnet 16b by angle θstep, because the joint grooves 34 are displaced by angle θstep from the holder arms 19 at the magnet holder 17c. Hence, the magnet 16c is shifted and fixed from the magnet 16a by the skew angle θskew=θstep×2 in the circumferential direction.

As described above, the skew angle at which the segment magnets stacked are displaced is mechanically set in the motor 1 according to the present invention. The motor 1 can therefore be more easily assembled than by the adhesive fixing, and the unevenness in skew angles can be reduced. The number of assembling man-hours can therefore be reduced, and the performance can be achieved as initially expected of the skew structure. Therefore, the cogging torque and torque ripple can be reduced in the brushless motor. Further, the skew angle can be easily set because it is determined by the positional relation between the joint grooves 34, and the holder arms 19, the skew angle can thus be set easily, as needed, in accordance with the specification of the motor. Moreover, an adhesive need not be applied and working efficiency can be improved because the magnets are mechanically fixed in position.

In addition, each step of the segment magnet is unitized, and the angle between the steps (step angle) is accurately set and assembled, reliably avoiding overlapping of adjacent segment magnets in the circumferential direction. This prevents the magnetic fluxes from being short-cut, successfully suppressing the output decrease due to the reduction in effective magnetic fluxes. Furthermore, the magnets can be completely magnetized, which also enhances the output.

For example, the present invention can be applied to a brushless motor of any other type for use in EPS's, though the embodiment described above is one designed for use in EPS's of column-assist type. In addition, the invention is not limited to motors for use in EPS's and various vehicles. Rather, the invention can be applied to brushless motors of various types. The embodiment described is a 6-pole, 9-slot brushless motor having six magnets. Nevertheless, neither the number of magnets nor the number of slots is limited. In addition, the present invention can be applied to rotating electrical machines other than motors, such as generators and the like.

What is claimed is:

1. A brushless motor of step-skew structure, comprising:
   rotor cores dividedly formed as plural sections in an axial direction;
   a plurality of segment magnets secured to outer circumferential surfaces of the rotor cores;
   magnet holders secured to the rotor cores and each having holder arms holding the segment magnet on the outer circumferential surface of the rotor core; and
   each of the rotor cores being displaced from one another by a step angle in a circumferential direction; wherein
   each of the rotor cores has holder-positioning parts and core side joint parts, the holder-positioning parts being made in an outer circumferential surface of the rotor core and configured to hold the holder arms, and the core side joint parts having a prescribed positional relation with the holder-positioning parts, and
   each of the magnet holders has holder side joint parts fitted in the core side joint parts and arranged in a prescribed positional relation with the holder arms.

2. The brushless motor according to claim 1, wherein each of the rotor cores has a plurality of lightening holes spaced equidistantly in the circumferential direction, and the core side joint parts are bridge parts, each provided between an adjacent pair of the lightening holes.

3. The brushless motor according to claim 2, wherein each of the magnet holders has joint projections so that lightening holes may be faced, and can be inserted in the lightening hole, and the holder side joint parts may be joint grooves, each formed between the projections.

4. The brushless motor according to claim 3, wherein the joint grooves are displaced from the holder arms, by the step angle in the circumferential direction.

* * * * *